(12) United States Patent
Gratton et al.

(10) Patent No.: US 8,245,253 B2
(45) Date of Patent: Aug. 14, 2012

(54) DISPLAYING MUSIC INFORMATION ASSOCIATED WITH A TELEVISION PROGRAM

(75) Inventors: Max Stephen Gratton, Lakewood, CO (US); Aaron Thomas Dobberstein, Denver, CO (US)

(73) Assignee: Dish Network L.L.C., Englewood, CO (US)

( * ) Notice: Subject to any disclaimer, the term of this patent is extended or adjusted under 35 U.S.C. 154(b) by 0 days.

(21) Appl. No.: 12/969,576

(22) Filed: Dec. 15, 2010

(65) Prior Publication Data

US 2012/0159535 A1 Jun. 21, 2012

(51) Int. Cl.
*G06F 13/00* (2006.01)
*G06F 3/00* (2006.01)
*H04N 5/445* (2011.01)

(52) U.S. Cl. .............................. 725/40; 725/32; 725/60
(58) Field of Classification Search .................... 725/32, 725/40, 60
See application file for complete search history.

(56) References Cited

U.S. PATENT DOCUMENTS

| | | | |
|---|---|---|---|
| 5,944,313 | A | 8/1999 | Hockley |
| 7,209,900 | B2 | 4/2007 | Hunter et al. |
| 7,254,454 | B2 | 8/2007 | Clapper |
| 2003/0005433 | A1* | 1/2003 | Janik et al. ........................ 725/18 |
| 2007/0180465 | A1 | 8/2007 | Ou et al. |
| 2008/0183757 | A1 | 7/2008 | Dorogusker et al. |
| 2009/0018898 | A1 | 1/2009 | Genen |
| 2009/0055462 | A1 | 2/2009 | Mori et al. |
| 2009/0070810 | A1 | 3/2009 | Lee |
| 2009/0077052 | A1 | 3/2009 | Farrelly |
| 2009/0119186 | A1 | 5/2009 | Ene |
| 2010/0063931 | A1 | 3/2010 | Cole et al. |
| 2010/0192171 | A1 | 7/2010 | Dozoretz et al. |
| 2010/0205626 | A1 | 8/2010 | Miller et al. |
| 2010/0251292 | A1 | 9/2010 | Srinivasan et al. |
| 2011/0093101 | A1 | 4/2011 | Casagrande |

FOREIGN PATENT DOCUMENTS

WO    WO 01/22731 A1    3/2001

OTHER PUBLICATIONS

Brown et al., "The Television Will Be Revolutionized: Effects of PVRs and Filesharing on Television Watching", CHI 2006 Proceedings-Media, Canada, Apr. 22-27, 2006, 663-666.
IBM, "Music ID on Demand (MIDO)", IP.com, Nov. 14, 2006, 1-3.
Kim et al., "Video Bookmark Based on Soundtrack Identification and Two-Stage Search for Interactive-Television", IEEE Transaction on Consumer Elec.,Nov. 2007, 53(4):1712-1717.
Kuwano et al., "A smart TV viewing and Web access interface based on video indexing techniques", IEEE, 2002, 204-205.
Suthakaran et al., "Artificial Intelligence in TV", 2010 2nd International Conference on Idustrial Mechatronics and Automation, IEEE, 2010, 595-598.
Wong, "One Stop Content sharing for internet-enabled TV through online service companies", IP.com, Feb. 7, 2008, 1-4.

* cited by examiner

*Primary Examiner* — Hunter B Lonsberry
(74) *Attorney, Agent, or Firm* — Kilpatrick Townsend & Stockton LLP

(57) ABSTRACT

Displaying music information associated with a television program is described. In one aspect, a television program is received that contains at least one music track. Information associated with the music track is identified and a request is received from a user to display music information associated with the television program. In response to the user request, a list is generated that identifies the music track in the television program.

34 Claims, 11 Drawing Sheets

DISPLAYING MUSIC INFORMATION ASSOCIATED WITH A TELEVISION PROGRAM

BACKGROUND

People are exposed to music in a variety of situations. For example, many television programs (and other audio/video programs) include music, soundtracks, and so forth. Additionally, television programs may contain commercials and other advertisements that include music. When watching a television program, a user may hear a music track that they enjoy and want to learn more about the artist performing the music track. Additionally, the user may want to purchase a copy of the music track for repeated listening. Unfortunately, many television programs provide little or no information related to the music tracks contained in the program.

Some existing television programs mention the music tracks contained in the program at the end of the program (e.g., with the program credits or other supplemental information). This presentation of music information creates difficulties for the user trying to identify a particular music track in a program that contains many music tracks. For example, the user is typically required to write down the music track information or rely on their memory to later recall the title and artist associated with the music track.

Other television programs display a URL (uniform resource locator) associated with a Web site that contains information related to music tracks contained in the program. This approach is also cumbersome since the user is required to visit the Web site and search for the desired music track. Often, the user must access the Web site from a different device (e.g., a computer) than the device presenting the television program (e.g., a television), which further complicates identification of the desired music. Therefore, it is desirable to provide an improved system for displaying music information to a viewer of a television program or other audio/video program.

SUMMARY

The described systems and methods relate to displaying music information associated with a television program. In a specific implementation, a television program is received that contains at least one music track. Information associated with the music track is identified and a request is received from a user to display music information associated with the television program. Based on this user request, a list is generated that identifies the music track contained in the television program.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

The systems and methods described herein relate to the display of music information associated with a television program to a viewer of the television program. These systems and methods allow the viewer (also referred to as a "user") to identify music tracks contained in the television program and obtain additional information about the music tracks via a user interface presented on a television or similar video display device. In particular examples, the user is presented with a title and artist associated with each music track as well as a timeline showing the chronological order of the music tracks contained in the television program. A user can also request additional information about a particular music track or purchase the music track for future listening independent of the television program. Other features of the described systems and methods allow a user to listen to a sample of the music track, view a scene from the television program during which the music track was played and/or mark the sample for later playback. A sample of a music track is a portion of the music track (e.g., 20-30 seconds) that allows the user to identify the music without playing the entire music track. The music information is provided to the user via the same television system that is displaying the television program.

As used herein, a television program may include an episode of a recurring television show, a movie, a live or recorded event, a commercial, or any other live or recorded audio/video content for viewing by a user. Although particular examples discussed herein refer to a television, alternate embodiments may include any display device capable of displaying video content to a user, including monitors, projectors, computers, mobile telephones, mobile communication devices and the like. In particular embodiments, a television uses internal or external speakers (or similar devices) to present the audio portion of the television program to a user. As used herein, a television receiver may include a set-top box, a satellite receiver, a game console, a media player, or any other device capable of processing audio/video content for display on a television or other display device.

Particular examples discussed herein refer to "music tracks" contained in a television program. These music tracks may include entire songs or portions of songs played at various times during the television program. The music tracks may be portions of published songs, modified versions of published songs or unpublished songs. The music tracks can be played as part of the actual television program content or played during a commercial or other advertisement contained in the television program. Music tracks can be of any length and played at any time in the television program.

An Exemplary System for Displaying Music Information

Figure 1:
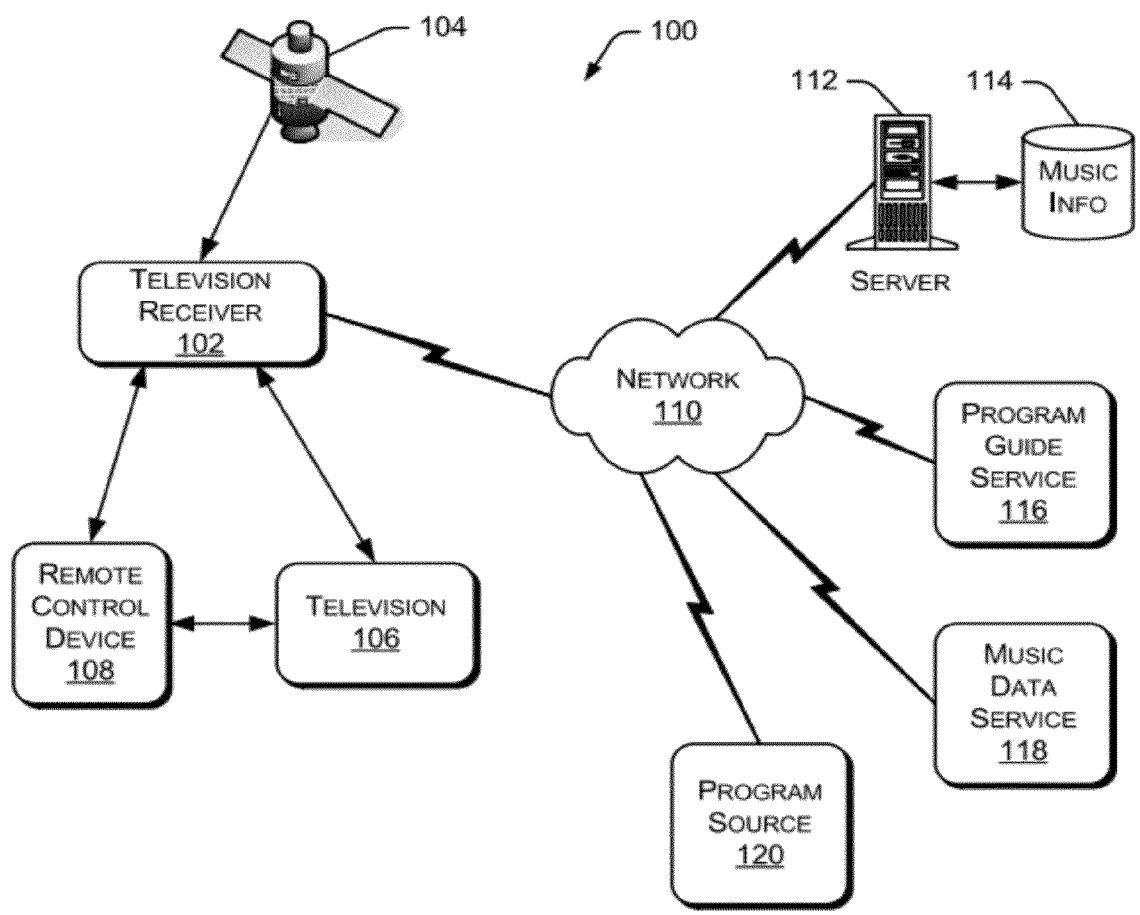
FIG. 1 shows an exemplary environment capable of implementing the systems and methods described herein.

FIG. 1 shows an exemplary environment 100 capable of implementing the systems and methods described herein. A television receiver 102 receives a signal containing one or more television programs from a program source. In various embodiments, the signal is received from a satellite 104, a cable distribution system, a terrestrial broadcast system, a data communication network 110 or any other system capable of communicating a signal that contains one or more television programs. The signal containing the television program may also contain additional information, referred to herein as "metadata", associated with the television program. This metadata may include information about music tracks contained in the television program.

Television receiver 102 is coupled to a television 106 and a remote control device 108. Television 106 receives audio and video data associated with a television program from television receiver 102. The video data is displayed by television 106 and the audio data is played to the user through internal speakers contained in television 106 or through external speakers coupled to television 106. In other implementations, the audio data is played to the user through any device capable of producing audible sound. Remote control device 108 is capable of communicating commands to both television receiver 102 and television 106. In an alternate embodiment, television receiver 102 is integrated into television 106.

Television receiver 102 is optionally coupled to data communication network 110, such as the Internet. Television receiver 102 may receive television programs, program metadata, and other information via data communication network 110. As shown in FIG. 1, television receiver 102 can communicate with various other devices and systems through data communication network 110. For example, a server 112 is coupled to data communication network 110 and a music information database 114. Server 112 provides music information (e.g., title, artist, and album cover images) to television receiver 102 and other devices coupled to data communication network 110. Data communication network 110 may use any network protocol and may include any network topology, including both wired and wireless communication systems.

A program guide service 116 coupled to data communication network 110 provides various television program content and schedule information to television receiver 102. Example program guide services are available from Tribune Media Services and TV Guide Networks. A music data service 118 provides music information, including samples of music tracks, to various systems via data communication network 110. Music data is available, for example, from a company that produces or sells music as well as producers of television programs. A program source 120 is capable of communicating television programs and other information to television receiver 102 across data communication network 110. Program source 120 can stream the television program to television receiver 102 for immediate playback, or the television receiver 102 may store the television program for future playback.

Although FIG. 1 illustrates specific components and systems coupled to data communication network 110, specific environments may include any number of components and systems coupled together via one or more data communication networks.

Figure 2:
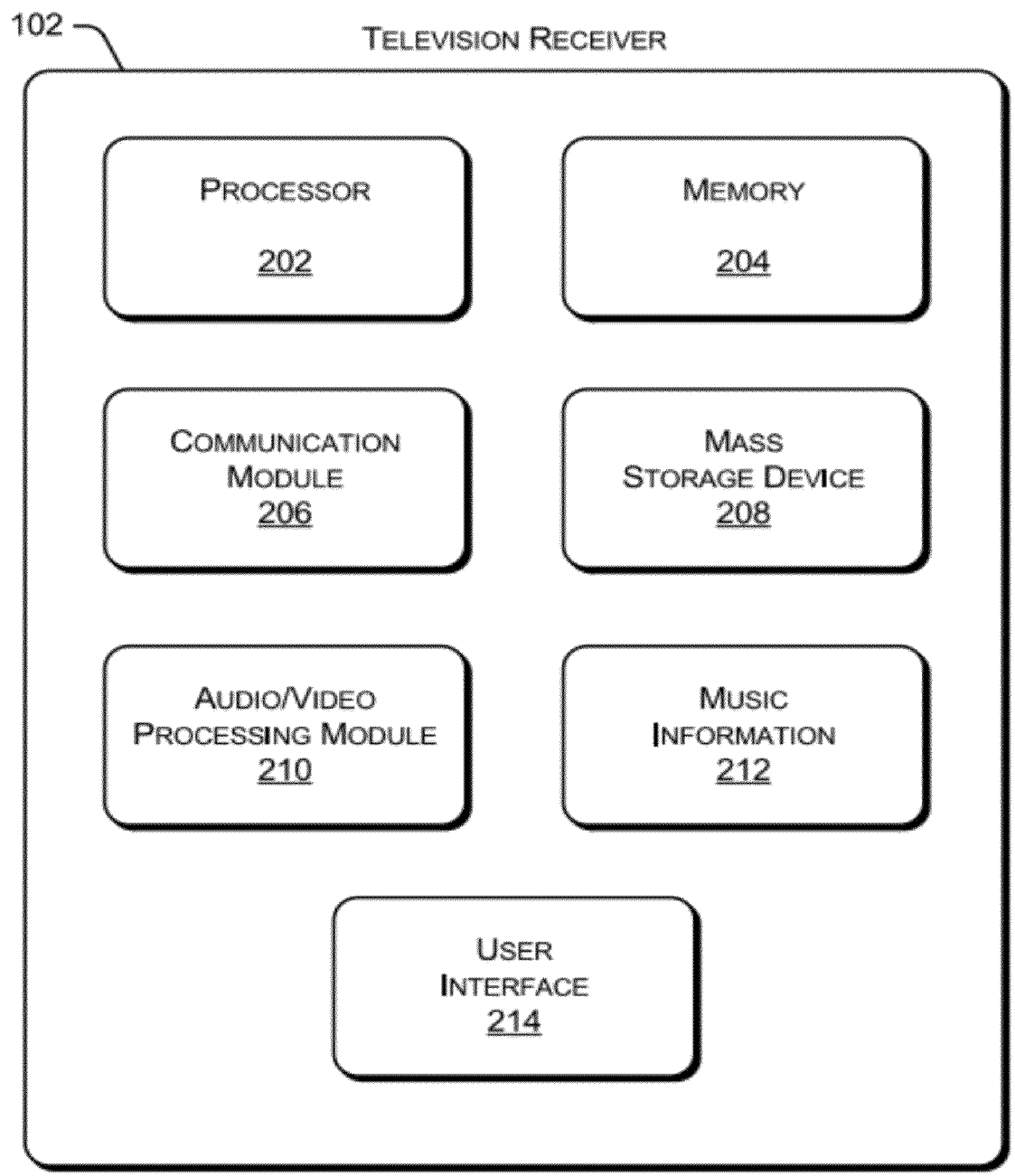
FIG. 2 is a block diagram showing various components of an exemplary television receiver, according to one embodiment.

FIG. 2 is a block diagram showing various components of exemplary television receiver 102, according to one embodiment. Television receiver 102 includes a processor 202, a memory 204, and a communication module 206. Processor 202 executes various instructions to implement the functionality discussed herein. Memory 204 stores these instructions as well as other data used by processor 202 and other modules contained in television receiver 102. Communication module 206 allows television receiver 102 to communicate with other devices and systems, such as satellite 104, television 106, and remote control device 108 shown in FIG. 1. Additionally, communication module 206 allows television receiver 102 to communicate with other devices and systems via data communication network 110.

Television receiver 102 also includes a mass storage device 208, such as a hard disk drive. Mass storage device 208 is capable of storing television programs, metadata associated with television programs, and the like. An audio/video processing module 210 performs various functions, such as decoding received signals, extracting metadata from received signals, and preparing video data for display by a television. Audio/video processing module 210 also prepares audio data for playback by a television or other device.

Television receiver 102 further includes music information 212, which includes information regarding music tracks contained in one or more television programs. Music information 212 also includes data regarding where to retrieve music information (e.g., music data services), samples of music tracks contained on one or more television programs, and information regarding purchasing and downloading music tracks. A user interface 214 allows a user to interact with television receiver 102 and presents various television program-related information to the user, such as information associated with music tracks contained in one or more television programs. In a particular implementation, user interface 214 allows the user to generate a listing of music tracks contained in a television program currently being viewed or previously viewed. In that implementation, user interface 214 also allows the user to perform additional functions related to the music tracks, such as the functions discussed herein.

An Exemplary Procedure for Displaying Music Information

Figure 3:
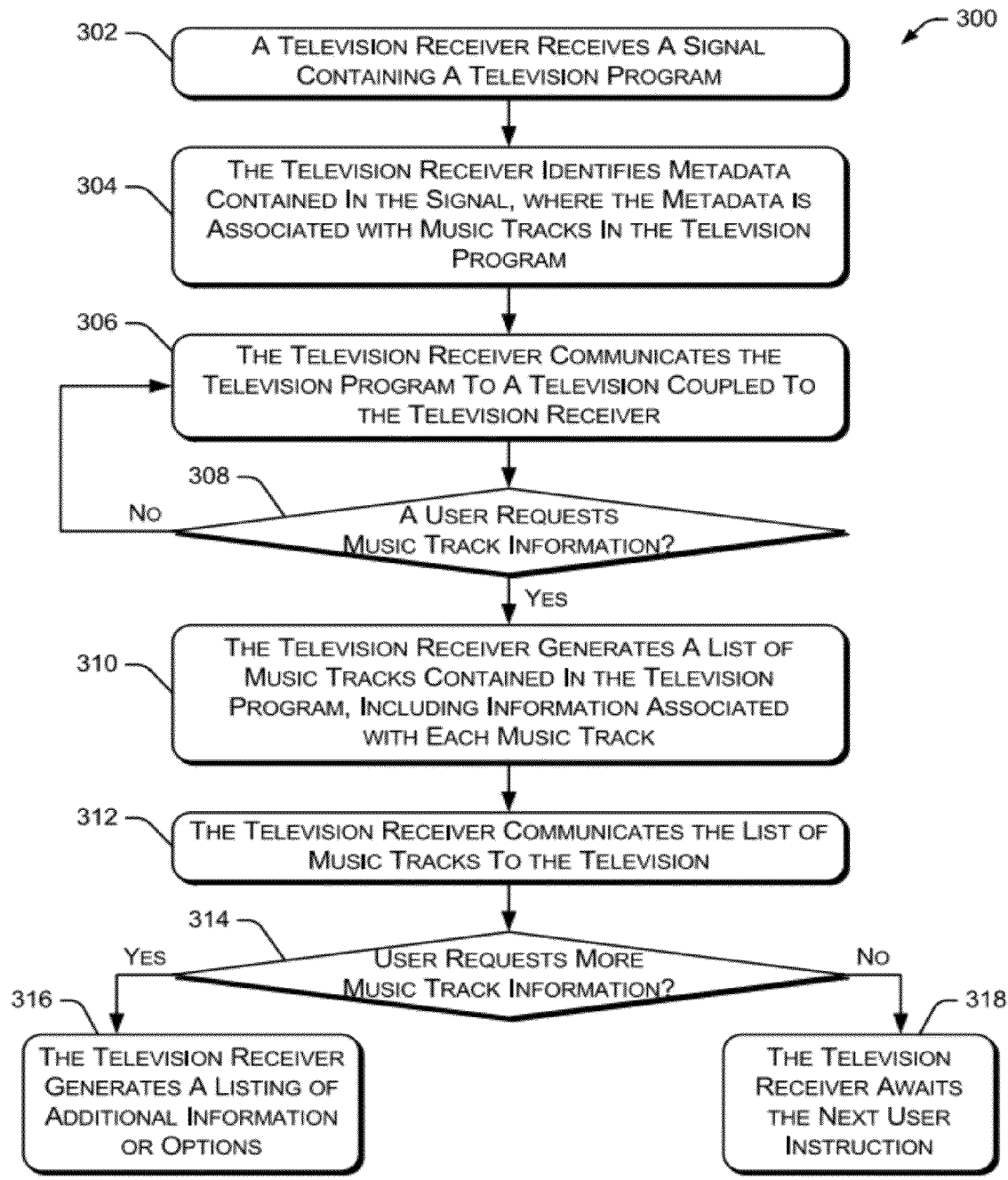
FIG. 3 shows an exemplary procedure for displaying music information associated with a television program, according to one embodiment.

FIG. 3 shows an exemplary procedure 300 for displaying music information associated with a television program, according to one embodiment. Initially, a television receiver receives a signal containing a television program (block 302). The television receiver identifies metadata contained in the received signal (block 304). This metadata includes information regarding the music tracks contained in the television program, such as the title and artist associated with each music track. After processing the received signal (e.g., decoding the signal), the television receiver communicates the television program to a television or other display device coupled to the television receiver (block 306).

As the television program is played to a user, the user may request information about music tracks contained in the television program. The user may request music information at any point during the program or after the program has ended. This request for information can be initiated using, for example, a button (or sequence of button activations) on a remote control device, a button on the television receiver, or a menu-based function accessible through the user interface. In a particular implementation, the remote control device includes a "music information" button for requesting information regarding music tracks in the television program.

The television program continues playing until a user requests music track information at block 308. At this point, the television receiver generates a list of music tracks contained in the television program (block 310). This list includes information associated with each music track, such as the approximate time the music track was played in the television program, the title of the music track, and the artist that performed the music track. In a particular embodiment, this music track information is contained in the metadata included with the signal received by the television receiver that contains the television program. In other embodiments, at least a portion of the music track information is retrieved from a remote system, such as a music data service.

After generating the list of music tracks contained in the television program, the television receiver communicates the list to the television for display to the user (block 312). An example list displayed to the user is discussed below with respect to FIG. 5. After presenting the music track list, the user has an option to request additional information regarding a specific music track (block 314). If the user requests more information, the television receiver generates a listing containing the additional information or additional options (block 316). An example list of additional information/options is discussed below with respect to FIG. 6. If the user does not request more information at block 314, the television receiver awaits the next user instruction (block 318).

Figure 4:
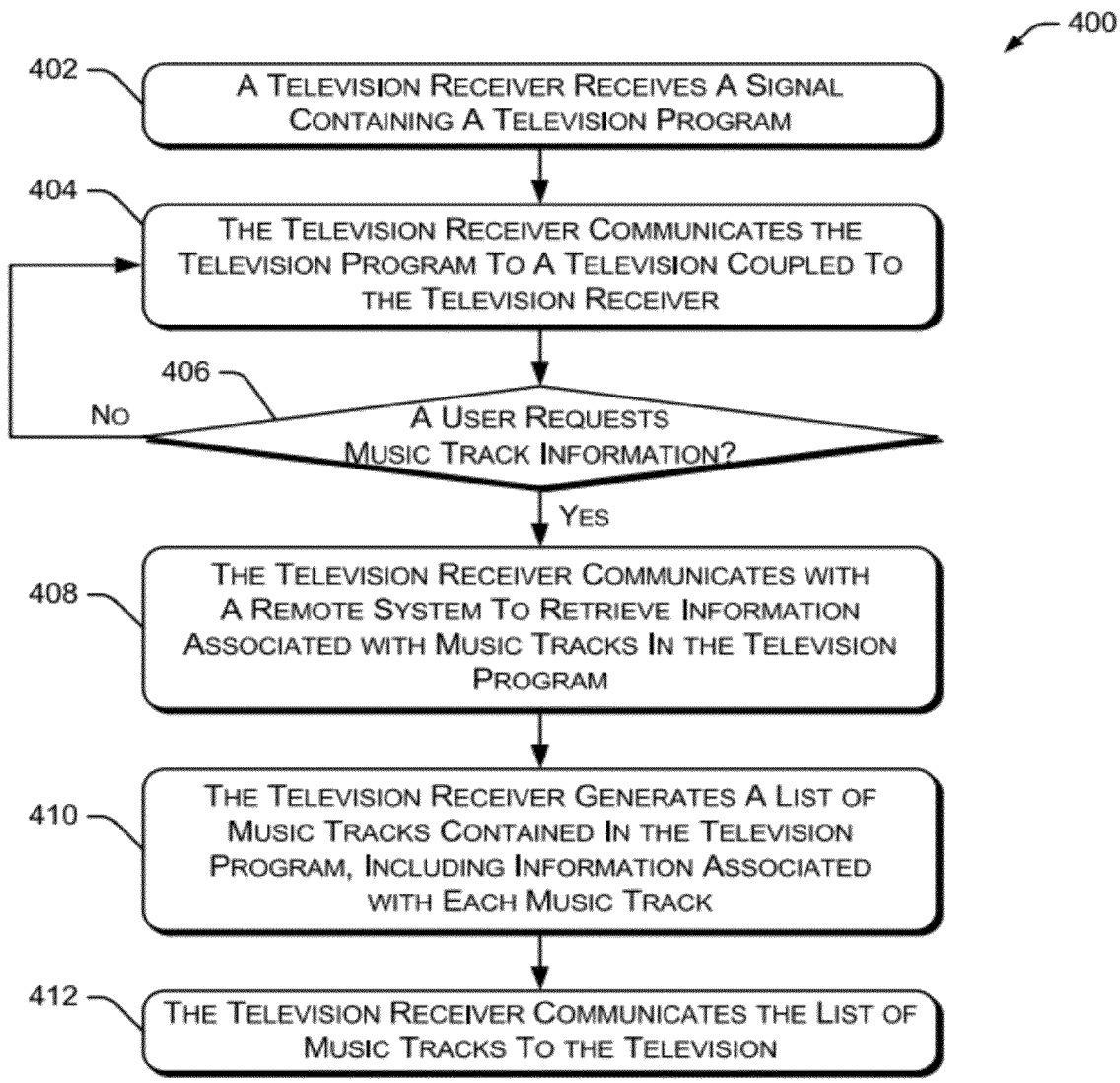
FIG. 4 shows another exemplary procedure for displaying music information associated with a television program, according to one embodiment.

FIG. 4 shows another exemplary procedure 400 for displaying music information associated with a television program, according to one embodiment. Procedure 400 is similar to the procedure discussed above with respect to FIG. 3, but the signal received by the television receiver does not contain metadata identifying with particularity the music contained within the television program. Procedure 400 begins as the television receiver receives a signal containing a television program (block 402). The television receiver then communicates the television program to a television coupled to the television receiver (block 404). If a user requests music track information associated with the television program at block 406, the television receiver communicates with a remote system to retrieve information associated with music tracks in the television program (block 408). Example remote systems include a program guide service, a music data service or a music information server of the type described above with respect to FIG. 1.

After retrieving the music track information, the television receiver generates a list of music tracks contained in the television program (block 410). This list includes information associated with each music track, such as the approximate time the music track was played in the television program, the title of the music track, and the artist that performed the music track. The television receiver then communicates the list of music tracks to the television (block 412). Although not shown in FIG. 4, the procedure may wait for a subsequent user instruction, such as requesting additional information regarding a music track or an instruction related to another television receiver function.

In an alternate embodiment, the television receiver automatically retrieves the music track information from the remote system after the user has watched a particular television program for a predetermined period of time. For example, if a user watches a specific television program for at least one minute, the television receiver retrieves the music track information associated with that television program. By automatically retrieving the music track information prior to a user request for the information, the television receiver can quickly respond to a user request for the music track information. In this embodiment, rather than retrieving the music track information each time a user begins viewing a different television program, the television receiver waits for a period of time to be certain the user is likely to continue watching that television program. In another embodiment, the television receiver automatically retrieves music track information associated with a television program after the user has scheduled the recording of the television program.

Figure 5:
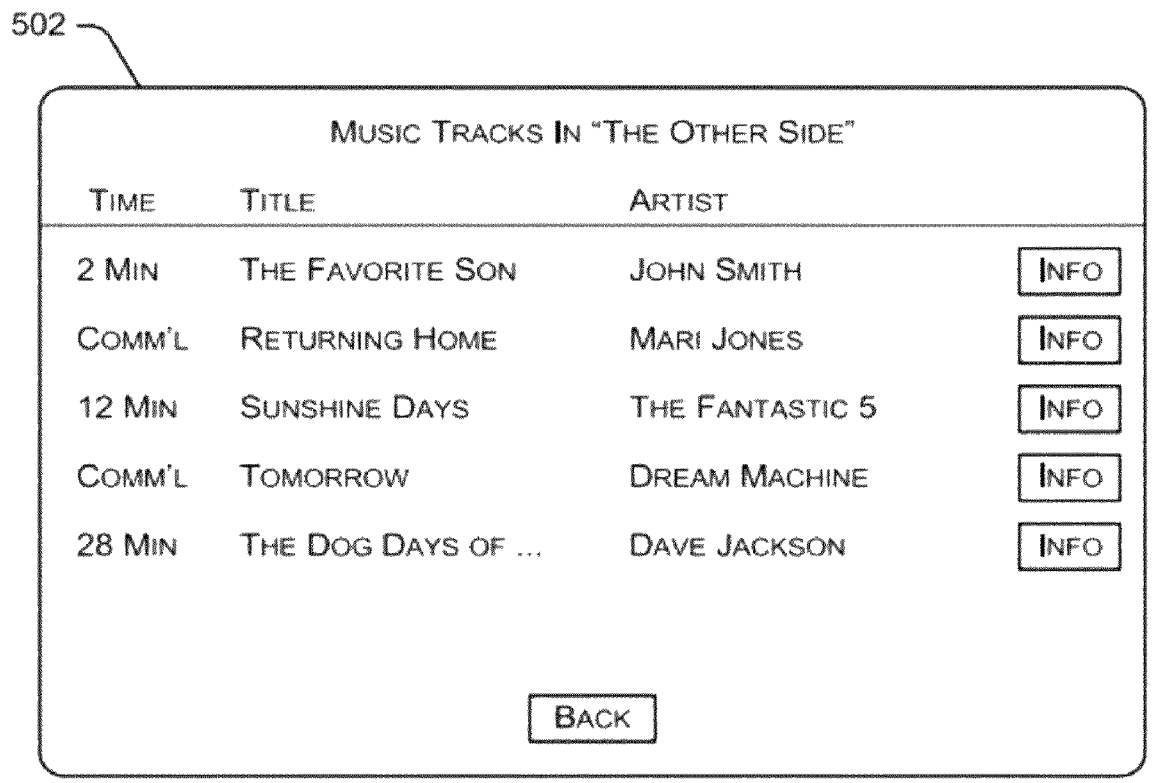
FIG. 5 shows an exemplary display that lists music tracks associated with a television program, according to one embodiment.

FIG. 5 shows an exemplary display 502 that lists music tracks associated with a television program, according to one embodiment. As discussed above, display 502 is presented to the user in response to a user request for information about music contained in a television program. In the example of FIG. 5, five music tracks are contained in the television program "The Other Side." Display 502 shows the approximate time that each music track was played in the television program as well as the title and artist associated with the music track. The five music tracks are listed in chronological order as they were played in the television program. For example, approximately two minutes from the beginning of the television program, the music track titled "The Favorite Son" by John Smith was played. The first commercial in the television program contained a music track titled "Returning Home" by Mari Jones. The music track "Sunshine Days" was played approximately 12 minutes from the beginning of the television program. As mentioned above, a particular music track may be a portion of the entire song. For example, a portion of "The Favorite Son" was played during the television program, not the entire song.

Display 502 includes an "Info" button associated with each music track. If the user activates one of the "Info" buttons, display 502 is replaced with a different display that provides additional information and options related to the specific music track selected (i.e., the music track associated with the "Info" button activated by the user). Display 502 also includes a "Back" button that, when activated, returns the user to the television program they were watching before display 502 was presented.

In an alternate embodiment, display 502 includes an image associated with each music track. The image is related to a scene in the television program that was shown when the music track was played. For example, music played during a police chase scene may include an image of a police car involved in the chase scene. The images associated with each music track can be included in the metadata communicated with the television program or retrieved by the television receiver from a remote service or system. These images help the user identify the desired music track from the list of multiple tracks contained in a particular television program. The images associated with each music track can be selected, for example, by a program editor, producer, director or other individual. In a specific implementation, the image associated with each music track replaces the "Time" portion of display 502. In other implementations, the image associated with each music track is displayed along with the "Time" portion of display 502.

Figure 6:
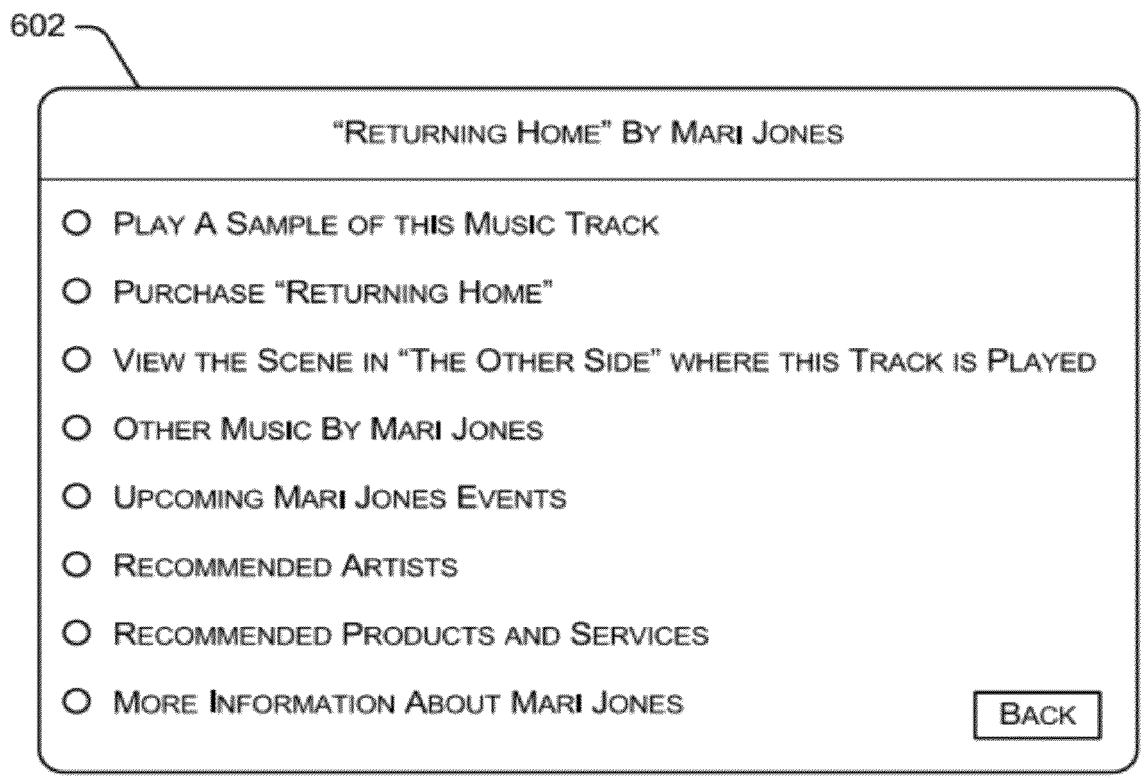
FIG. 6 shows an exemplary display that lists additional options associated with a particular music track, according to one embodiment.

FIG. 6 shows an exemplary display 602 that lists additional options associated with a particular music track, according to one embodiment. In this example, display 602 is associated with the music track "Returning Home" by Mari Jones—one of the music tracks shown in FIG. 5. Options shown in display 602 include playing a sample of the music track, which allows the user to be certain they identified the desired music track in the television program. Other options include purchasing the music track and viewing the scene in the television program in which the audio track was played. The user can also receive information about other music by the same artist, upcoming events (e.g., concerts) by the artist, and other recommended artists. Display 602 also includes recommended products and services, as well as an option to get more information about the artist, such as biographical information about the artist or an explanation of a song's lyrics. Other types of information that may be displayed to the user include local radio stations that play music similar to the music track and upcoming music-related activities in the user's geographic area.

Figure 7:
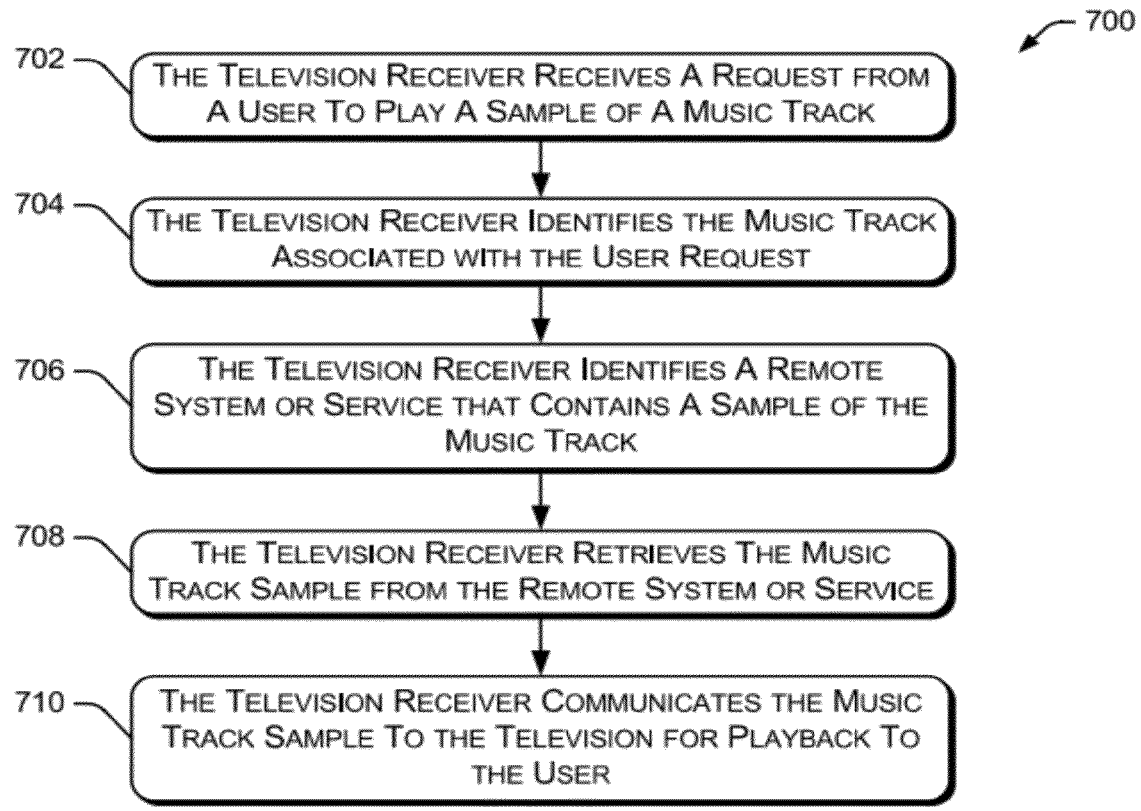
FIG. 7 shows an exemplary procedure for playing a sample of a music track contained in a television program, according to one embodiment.

FIG. 7 shows an exemplary procedure 700 for playing a sample of a music track contained in a television program, according to one embodiment. Initially, the television receiver receives a request from a user to play a sample of a music track contained in a television program (block 702). The television receiver identifies the specific music track associated with the user request (block 704), such as a title and artist associated with the music track. As discussed herein, this music information is available from metadata received with the television program or from a music data service or system. The television receiver then identifies a remote system or service that contains a sample of the music track (block 706). For example, a music information server or a music data service may contain samples of various music tracks.

Procedure 700 continues as the television receiver retrieves the music sample from the remote system or service (block 708) using the identification information associated with the music track. The television receiver then communicates the music track sample to the television for playback to the user (block 710). For example, the music track sample is played though the television's speakers or through another sound-generating device. After listening to the music track sample, the user can easily determine whether they identified the correct music track from the list of music tracks contained in the television program. If the user did identify the correct music track, they can purchase the music track or request additional information about the music track, as discussed herein. If the user did not identify the correct music track, they can request a sample of another music track in the television program.

Figure 8:
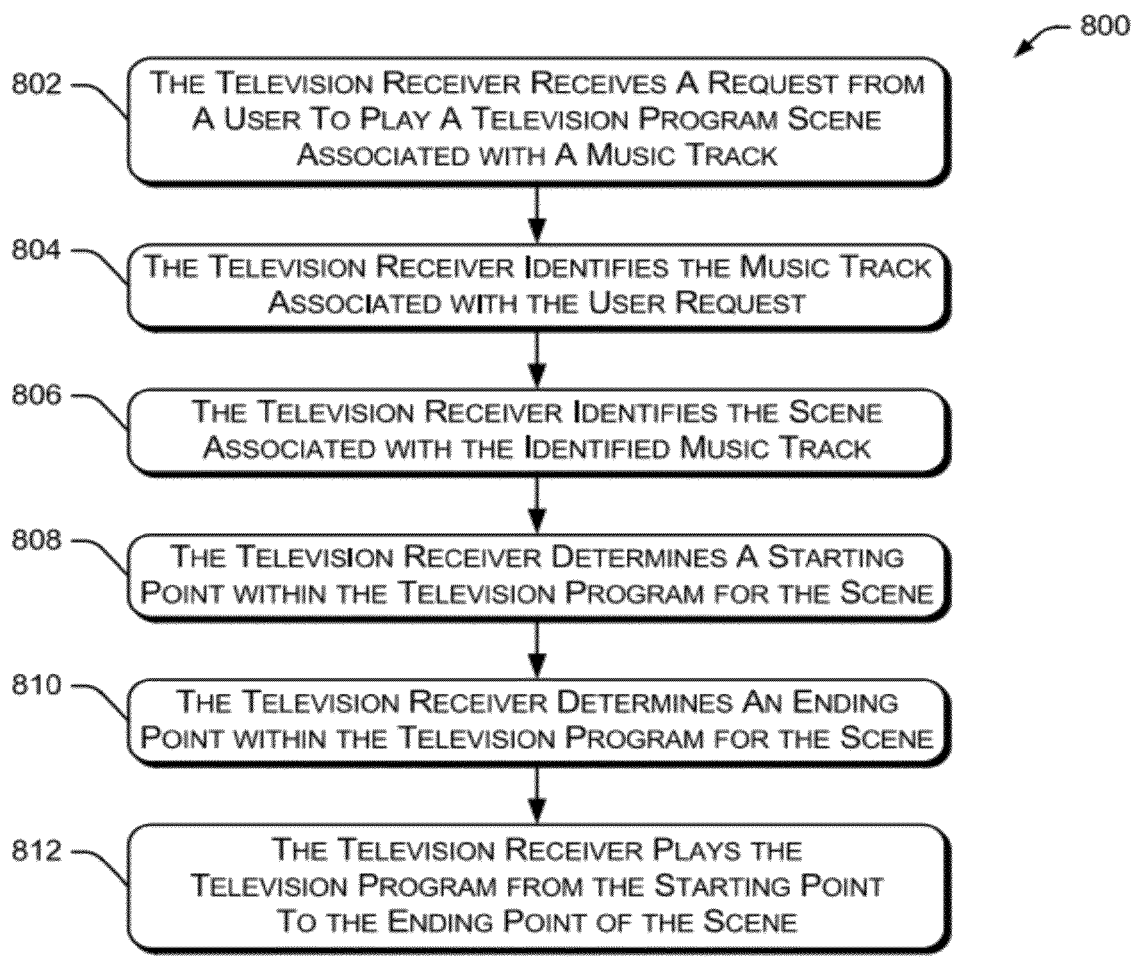
FIG. 8 shows an exemplary procedure for playing a scene from a television program associated with a music track, according to one embodiment.

FIG. 8 shows an exemplary procedure 800 for playing a scene from a television program associated with a music track, according to one embodiment. Initially, the television receiver receives a request from a user to play a television program scene associated with a particular music track (block 802). For example, if the user likes a particular music track associated with a chase scene in the television program, the user may want to watch that chase scene again (and hear the music track again). The television receiver identifies the music track associated with the user request (block 804).

Based on the identified music track, the television receiver identifies the scene associated with the music track (block 806). In particular embodiments, the scene is identified based on metadata associated with the television program, program timing information, image detection systems or algorithms, audio detection systems or algorithms, and the like. Based on the identified scene, the television receiver determines a starting point within the television program for the identified scene (block 808). Next, the television receiver determines an ending point within the television program for the identified scene (block 810). Finally, the television receiver plays the television program from the starting point to the ending point of the scene (block 812). This procedure allows the user to enjoy their favorite music track and the associated portion of the television program without having to watch the entire program or search through the television program to locate the desired scene.

In a particular embodiment, the television receiver plays the audio portion of the identified scene, including the music track, but does not play the video portion of the desired scene. This allows the user to hear the music track within the context of the television program (e.g., hearing actor dialog and background noises along with the music track).

Figure 9:
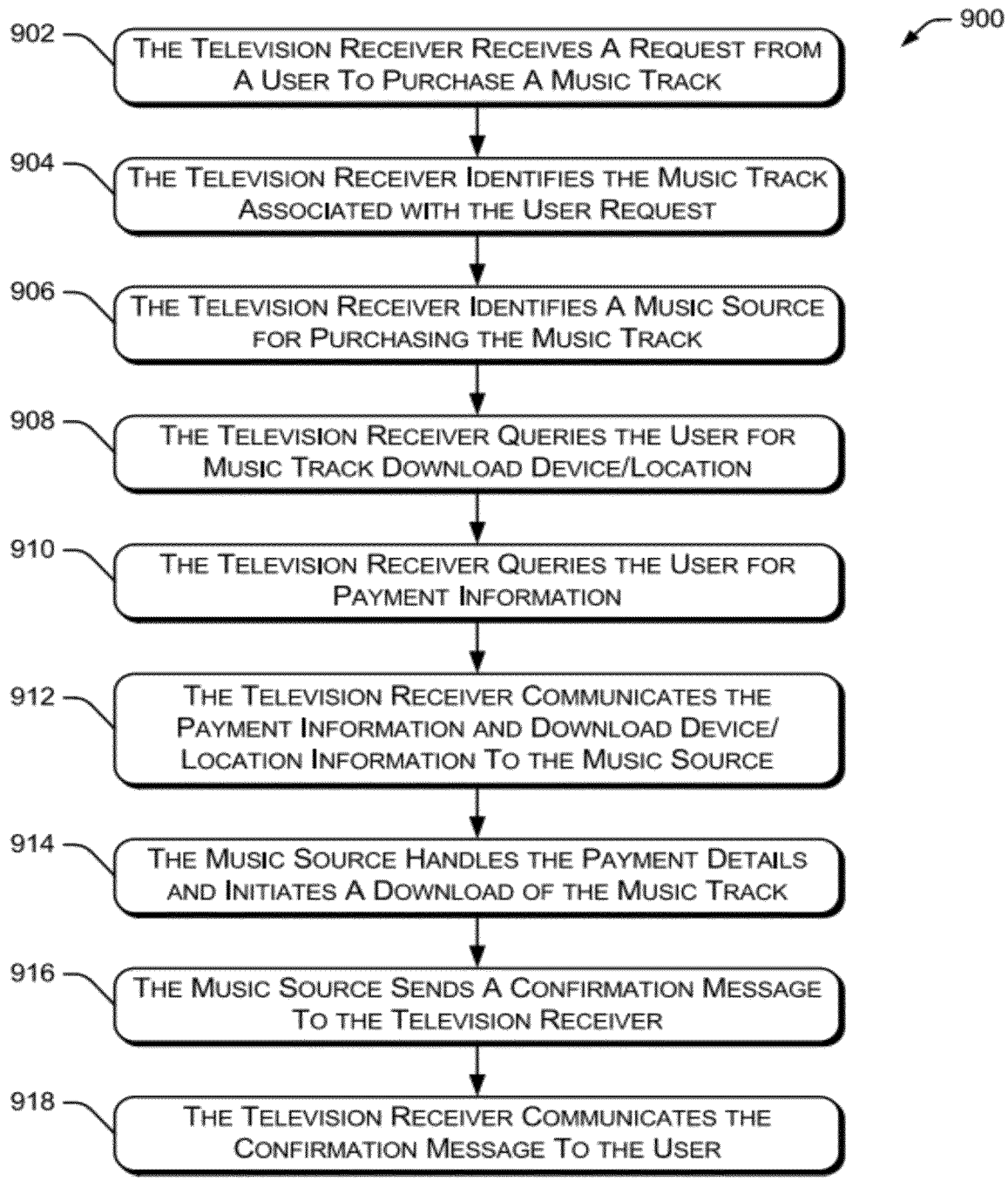
FIG. 9 shows an exemplary procedure for purchasing a music track contained in a television program, according to one embodiment.

FIG. 9 shows an exemplary procedure 900 for purchasing a music track contained in a television program, according to one embodiment. Initially, the television receiver receives a request from a user to purchase a music track (block 902). The television receiver identifies the music track associated with the user request (block 904) and identifies a music source for purchasing the music track (block 906). In a particular embodiment, the service providing the television program has made arrangements with one or more sources for purchasing music tracks. The television receiver then queries the user for music track download information, such as the download device and/or the download location (block 908). For example, the user can download the music track to the television receiver, a computer, a cellular phone, a portable music player or an online music storage service, such as a music locker.

After the user provides music download information, the television receiver queries the user for payment information (block 910). The user can provide payment information, such as credit card information, or provide information regarding an existing account. The existing account may be associated with the service from which the music track is purchased. In an alternate embodiment, the purchase cost of the music track is charged to the user's account with the company providing the television program, such as a satellite television service or a cable television service.

The television receiver then communicates the payment information (or the account information) and the music download information to the music source that contains the music track being purchased (block 912). The music source handles the payment details and initiates a download of the music track to the appropriate destination device or destination service (block 914). In an alternate embodiment, the music source sends a message to the user that contains instructions for downloading the purchased music track. After downloading the music track (or sending download instructions), the music source sends a confirmation message to the television receiver (block 916), which is then communicated to the user by the television receiver (block 918). The above procedure allows the user to quickly and easily purchase a music track simply by interacting with the television receiver.

Figure 10:
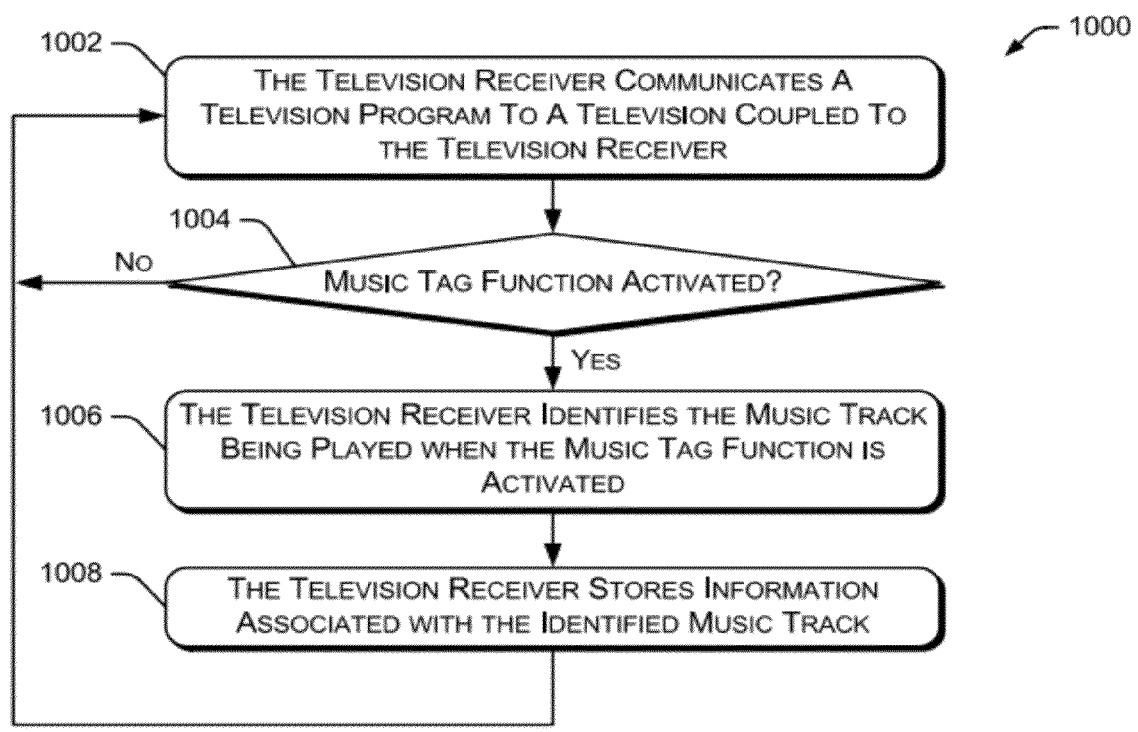
FIG. 10 shows an exemplary procedure for tagging music tracks associated with a television program, according to one embodiment.

FIG. 10 shows an exemplary procedure 1000 for tagging music tracks associated with a television program, according to one embodiment. A user tags certain music tracks during the viewing of one or more television programs, thereby allowing the user to "remember" the music tracks at a later time (e.g., after the television program has finished). By tagging music tracks, the user does not need to interrupt the currently viewed television program or attempt to remember the music tracks of interest to the user.

Referring to FIG. 10, the television receiver communicates a television program to a television coupled to the television receiver (block 1002). As the television program is played to the user, the procedure monitors the user's activity for activation of a music tag function (block 1004). The music tag function can be activated, for example, by a button (or sequence of button activations) on a remote control device, a menu command in a user interface, a button on the television receiver, and so forth. When the procedure detects activation of the music tag function, the television receiver identifies the music track being played upon activation of the music tag function (block 1006). This identification may include the title and artist of the music track or a unique identifier associated with the music track. As discussed herein, identification of the music track may include metadata communicated with a television program containing the music track or retrieved from another system or service.

After identifying the tagged music track, the television receiver stores information associated with the identified music track in a memory device, file or other data structure for future reference (block 1008). When the user of the television receiver wants to view the tagged music tracks, the television receiver generates a list of tagged music tracks. This listing of tagged music tracks may include music tracks from multiple television programs viewed at different times. In a particular embodiment, the displayed list of tagged music tracks is similar to the listing shown in FIG. 5. If the user wants additional information about a particular music track, the user can activate an "Info" button or otherwise select the desired music track. In a particular embodiment, the additional information and options associated with a music track are displayed in a manner similar to that shown in FIG. 6.

In one embodiment, the television receiver retrieves a sample of each tagged music track soon after the user tags the music track. Since the user has shown an interest in the music track, the television receiver retrieves the music sample to avoid allow immediate playback of the sample upon request by the user. Similarly, the television receiver may retrieve additional information about each tagged music track soon after the user tags the music track.

Figure 11:
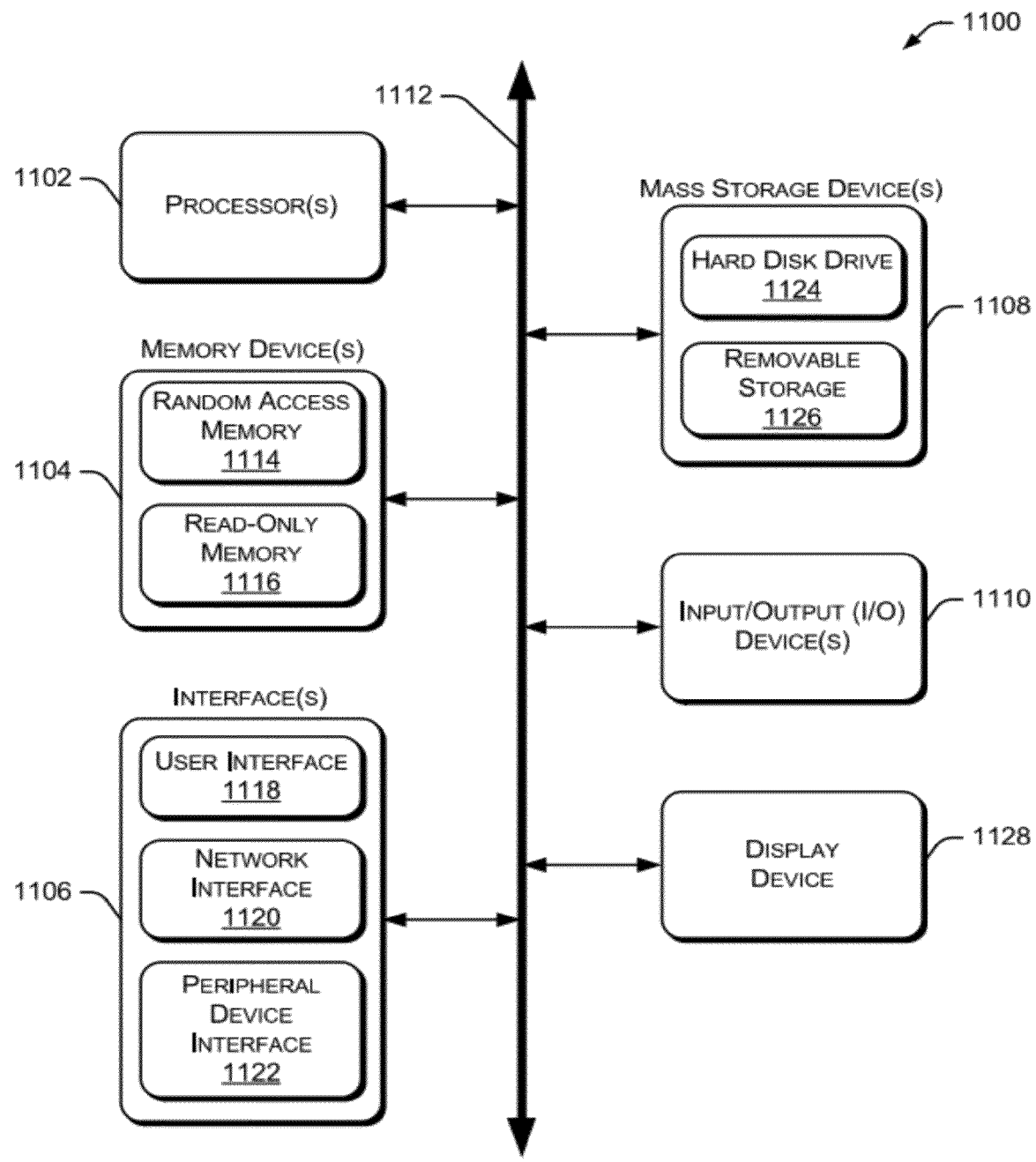
FIG. 11 is a block diagram showing an exemplary computing device, according to one embodiment.

FIG. 11 is a block diagram showing an exemplary computing device 1100, according to one embodiment. Computing device 1100 may be used to perform various procedures, such as those discussed herein. Computing device 1100 can function as a server, a client or any other computing entity. Computing device 1100 can be any of a wide variety of computing devices, such as a desktop computer, a notebook computer, a server computer, a handheld computer, a tablet computer, and the like.

Computing device 1100 includes one or more processor(s) 1102, one or more memory device(s) 1104, one or more interface(s) 1106, one or more mass storage device(s) 1108, one or more Input/Output (I/O) device(s) 1110, and a display device 1128 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM)) 1114 and/or nonvolatile memory (e.g., read-only memory (ROM)) 1116. Memory device(s) 1104 may also include rewritable ROM, such as Flash memory.

Mass storage device(s) 1108 include various computer readable media, such as magnetic tapes, magnetic disks, optical disks, solid state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable storage 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, lenses, CCDs or other image capture devices, and the like.

Display device 1128 includes any type of device capable of displaying information to one or more users of computing device 1100. Examples of display device 1128 include a monitor, display terminal, video projection device, and the like.

Interface(s) 1106 include various interfaces that allow computing device 1100 to interact with other systems, devices, or computing environments. Example interface(s) 1106 include any number of different network interfaces 1120, such as interfaces to local area networks (LANs), wide area networks (WANs), wireless networks, and the Internet. Other interfaces include user interface 1118 and peripheral device interface 1122.

Bus 1112 allows processor(s) 1102, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

CONCLUSION

Although the systems and methods for displaying music information associated with a television program have been described in language specific to structural features and/or methodological operations or actions, it is understood that the implementations defined in the appended claims are not necessarily limited to the specific features or actions described. Rather, the specific features and operations of displaying music information associated with a television program are disclosed as exemplary forms of implementing the claimed subject matter.

The invention claimed is:

1. A processor-implemented method comprising:
   receiving a television program containing at least one music track;
   identifying music information associated with the at least one music track;
   receiving a request from a user to display music information associated with the television program; and
   generating a list identifying the at least one music track in the television program responsive to the user request and based on the identified music information, wherein the list includes an image identifying the music track, and the image identifies a scene associated with the music track.

2. A method as recited in claim 1 wherein the television program includes a plurality of music tracks and wherein the list identifies the plurality of music tracks.

3. A method as recited in claim 1 further comprising communicating the list to a display device viewed by the user.

4. A method as recited in claim 1 wherein the list includes at least one of a name of an artist that performed the music track and a name of the music track.

5. A method as recited in claim 1 wherein the list includes an option to purchase the music track.

6. A method as recited in claim 5 wherein the list further includes an option to automatically download the purchased music track to a remote device.

7. A method as recited in claim 1 wherein the list includes an option to listen to a sample of the music track.

8. A method as recited in claim 1 wherein the list includes an option to view a scene in the television program that contained the music track.

9. A method as recited in claim 1 wherein the list includes an option to receive additional information about one of the plurality of music tracks.

10. A method as recited in claim 9 wherein the additional information includes events associated with an artist that performed the music track.

11. A method as recited in claim 9 wherein the additional information includes recommendations for other music tracks performed by the same artist that performed the music track in the television program.

12. A method as recited in claim 9 wherein the additional information includes products associated with an artist that performed the music track.

13. A method as recited in claim 1 wherein generating the list occurs after viewing of the television program.

14. A method as recited in claim 2 wherein the list of music tracks is arranged in chronological order based on presentation of the music tracks in the television program.

15. A method as recited in claim 1 wherein identifying music information associated with the at least one music track includes retrieving the music information from metadata received with the television program.

16. A method as recited in claim 1 wherein identifying music information associated with the at least one music track includes retrieving the music information from data associated with electronic program guide data.

17. A method as recited in claim 1 wherein identifying music information associated with the at least one music track includes retrieving the music information from a remote computing device containing music track information.

18. A method as recited in claim 1 wherein the television program includes a commercial and wherein the at least one music track is contained in the commercial.

19. A television receiver comprising:
a processor; and
a memory coupled to the processor, the memory comprising processor-executable instructions that, when executed by the processor, perform operations including:
  receiving an audio/video stream associated with a television program, the audio/video stream including a plurality of music tracks;
  identifying title and artist information associated with each of the plurality of music tracks;
  identifying an image associated with each of the plurality of music tracks, wherein each image is associated with a scene in the television program that contained the associated music track;
  generating a list of music tracks contained in the audio/video stream in response to a user request to display music information associated with the television program, wherein the list of music tracks includes the title and artist information associated with each of the music tracks; and
  communicating the list of music tracks to a display device coupled to the television receiver.

20. A television receiver as recited in claim 19 wherein the memory further comprises processor-executable instructions that, when executed by the processor, retrieve a sample of each of the plurality of music tracks.

21. A television receiver as recited in claim 19 wherein the memory further comprises processor-executable instructions that, when executed by the processor, retrieve additional music information associated with at least one of the plurality of music tracks.

22. A television receiver as recited in claim 19 further comprising a mass storage device coupled to the processor and configured to store title and artist information associated with each of the plurality of music tracks.

23. A television receiver as recited in claim 19 wherein the list of music tracks further includes an option to receive more information about each of the music tracks.

24. A television receiver as recited in claim 19 wherein the list of music tracks further includes an option to purchase each of the music tracks.

25. A processor-implemented method comprising:
communicating a television program containing a plurality of music tracks to a display device viewed by a user;
receiving a request from the user to tag a currently playing music track;
identifying the currently playing music track;
storing the identification of the currently playing music track in a storage device;
receiving a request from the user to view a list of tagged music tracks;
identifying at least one tagged music track;
generating the list of tagged music tracks;
communicating the list of tagged music tracks to the display device; and
identifying tagged music tracks associated with a plurality of television programs.

26. A method as recited in claim 25 wherein identifying the currently playing music track includes identifying title and artist information associated with the currently playing music track.

27. A method as recited in claim 25 wherein the list of tagged music tracks includes an option to listen to a sample of the music track.

28. A method as recited in claim 25 wherein the list of tagged music tracks includes an option to purchase the music track.

29. A processor-implemented method comprising:
receiving a television program containing at least one music track;
identifying music information associated with the at least one music track;
receiving a request from a user to display music information associated with television program; and
generating a list identifying the at least one music track in the television program responsive to the user request and based on the identified music information, wherein the list includes an option to view a scene in the television program that contained the at least one music track.

30. A processor-implemented method comprising:
  receiving a television program containing at least one music track;
  identifying music information associated with the at least one music track;
  receiving a request from a user to display music information associated with the television program; and
  generating a list identifying the at least one music track in the television program responsive to the user request and based on the identified music information, wherein the list includes an option to receive additional information about at least one of music tracks, and wherein the additional information includes events associated with an artist that performed the music track.

31. A processor-implemented method comprising:
  receiving a television program containing at least one music track;
  identifying music information associated with the at least one music track;
  receiving a request from a user to display music information associated with the television program; and
  generating a list identifying the at least one music track in the television program responsive to the user request and based on the identified music information, wherein generating the list occurs after viewing of the television program.

32. A processor-implemented method comprising:
  receiving a television program containing at least one music track;
  identifying music information associated with the at least one music track;
  receiving a request from a user to display music information associated with the television program; and
  generating a list identifying the at least one music track in the television program responsive to the user request and based on the identified music information, wherein the television program includes a plurality of music tracks and wherein the list identifies the plurality of music tracks, and the list of music tracks is arranged in chronological order based on presentation of the music tracks in the television program.

33. A processor-implemented method comprising:
  receiving a television program containing at least one music track;
  identifying music information associated with the at least one music track, wherein identifying music information associated with the at least one music track includes retrieving the music information from data associated with electronic program guide data;
  receiving a request from a user to display music information associated with the television program; and
  generating a list identifying the at least one music track in the television program responsive to the user request and based on the identified music information.

34. A television receiver comprising:
  a processor;
  a memory coupled to the processor, the memory comprising processor-executable instructions that, when executed by the processor, perform operations including:
    receiving an audio/video stream associated with a television program, the audio/video stream including a plurality of music tracks;
    identifying title and artist information associated with each of the plurality of music tracks;
    generating a list of music tracks contained in the audio/video stream in response to a user request to display music information associated with the television program, wherein the list of music tracks includes the title and artist information associated with each of the music tracks; and
    communicating the list of music tracks to a display device coupled to the television receiver; and
  a mass storage device coupled to the processor and configured to store title and artist information associated with each of the plurality of music tracks.

* * * * *

UNITED STATES PATENT AND TRADEMARK OFFICE
CERTIFICATE OF CORRECTION

| | | |
|---|---|---|
| PATENT NO. | : 8,245,253 B2 | |
| APPLICATION NO. | : 12/969576 | |
| DATED | : August 14, 2012 | |
| INVENTOR(S) | : Max Stephen Gratton et al. | |

It is certified that error appears in the above-identified patent and that said Letters Patent is hereby corrected as shown below:

In the Claims:

Column 12, line 60, please insert --the-- between 'with' and 'television'.

Signed and Sealed this
Twentieth Day of November, 2012

David J. Kappos
*Director of the United States Patent and Trademark Office*